Figure 1:
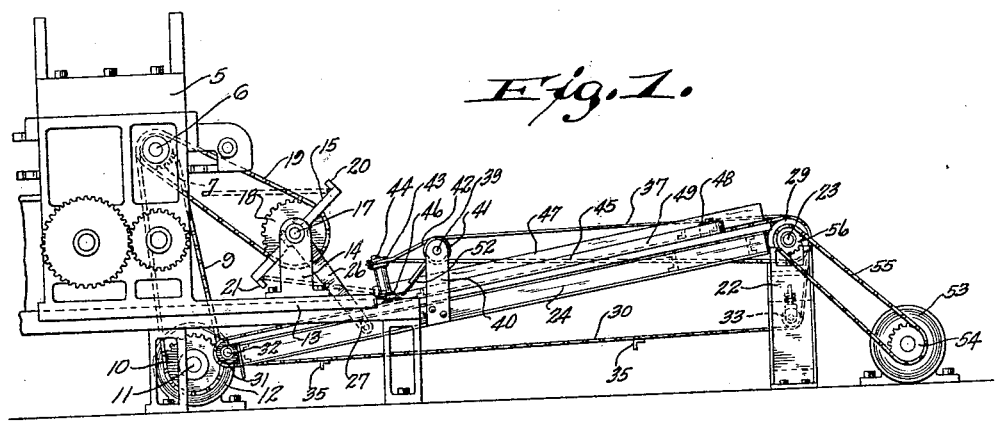

Aug. 30, 1932.  A. W. WERNER  1,874,675

SHEET HANDLING DEVICE

Filed May 18, 1929

INVENTOR.

Arthur W. Werner

BY

Morsell, Keeney, & Morsell

ATTORNEYS.

Patented Aug. 30, 1932

1,874,675

UNITED STATES PATENT OFFICE

ARTHUR W. WERNER, OF MILWAUKEE, WISCONSIN, ASSIGNOR TO KIECKHEFER CONTAINER COMPANY, OF MILWAUKEE, WISCONSIN, A CORPORATION OF MAINE

SHEET HANDLING DEVICE

Application filed May 18, 1929. Serial No. 364,197.

This invention relates to improvements in sheet handling devices.

In box making devices, where sheets of material are discharged from a machine with a certain side facing upwardly, it is sometimes necessary to have said sheets conveyed to another machine with the reverse side facing upwardly.

It is, therefore, one of the objects of this invention to provide an improved sheet handling device having means for intercepting sheets of material as they are being discharged from a machine and for depositing said sheets on a conveyer with their reverse sides facing upwardly.

A further object of this invention is to provide a sheet handling device having means for engaging said sheets after they have been turned over to properly aline the same on a conveyer preparatory to delivery to another machine.

A further object of this invention is to provide a sheet handling device which is simple in construction and operation, and is well adapted for the purpose described.

With the above and other objects in view, the invention consists of the improved sheet handling device, and all its parts and combinations, as set forth in the claims, and all equivalents thereof.

Figure 2:
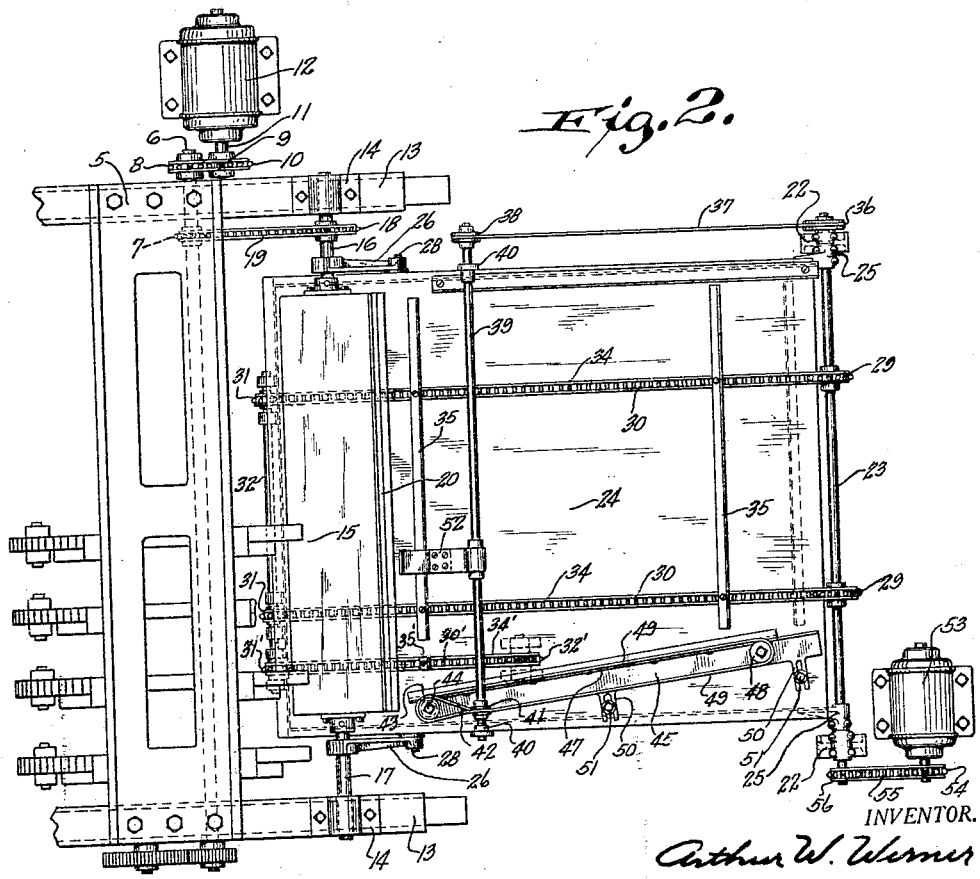

In the accompanying drawing in which the same reference numerals designate the same parts in all of the views:

Fig. 1 is a side elevation of the improved sheet handling device, showing it in attachment with a box making machine, parts being broken away; and Fig. 2 is a plan view thereof.

Referring to the drawing, the numeral 5 designates a box making machine having a drive shaft 6 journaled transversely therethrough. The said drive shaft has sprocket wheels 7 and 8 mounted rigidly thereon, the latter being connected by an endless chain 9 with a sprocket wheel 10 rigidly mounted on the shaft 11 of a motor 12.

Extensions 13, from each side of the machine carry bearings 14. A shelf 15 has trunnions 16 and 17 extending from each end thereof, the said trunnions having their outer ends journaled in the bearings 14. The trunnion 16 carries a rigidly mounted sprocket wheel 18 which is connected by an endless chain 19 with the sprocket wheel 7 on the shaft 6. A shoulder 20 is provided along one longitudinal edge on one side of the shelf, and a similar shoulder 21 is provided along the opposite longitudinal edge on the other side of the shelf.

Bearing stands 22, extending upwardly from the floor have a shaft 23 journaled therein. One end of a conveyer platform 24 is pivotally carried by said shaft as at 25. Arms 26, having elongated openings 27 therein are adjustably connected to the sides of the platform near its other end by means of bolts 28 which extend through the said elongated openings. The other ends of the arms 26 are in the form of bearings through which the trunnions 16 and 17 of the rotatable shelf extend.

Sprocket wheels 29, which are rigidly mounted on the shaft 23 are connected by endless chains 30 with sprocket wheels 31 mounted on a shaft 32. The said chains pass beneath chain tighteners 33 and through slots 34 in the platform 24. Pusher bars 35, for moving the sheets, are carried by said endless chains.

Another sprocket wheel 31' on the shaft 32 is connected by a short endless chain 30' with a sprocket wheel 32' rotatably mounted on a short shaft journaled below the platform. The said endless chain travels in a slot 34' in the platform, and is provided with lugs 35'.

A pulley 36, mounted rigidly on one end of the shaft 23 is connected by an endless belt 37 with a pulley 38 rigidly mounted on a shaft 39, the latter shaft being journaled above the platform in bearings 40. Near the other end of the shaft 39, another pulley 41 is rigidly mounted, the said pulley being connected by a belt 42 with a pulley 43 mounted rigidly on a shaft 44. The latter shaft has its lower end rotatably carried by a gauge bar 45. On the lower end of the shaft 44 another pulley 46 is rigidly carried, the said pulley extending through an opening in the side 47 of the gauge bar 45. Near the other end of the gauge bar, a pulley 48 is rotatably carried, the latter pulley also projecting through the side of the gauge bar. An endless belt 49 connects the pulleys 46 and 48, one side of said belt extending on one side of the side 47 of the gauge bar 45 and the other side of the belt extending on the other side. The gauge bar has forked extensions 50, through which bolts 51 extend to adjustably secure the gauge bar in a desired angular position with relation to the side of the platform 24.

A drag member 52, having an upwardly curved end portion, is loosely carried by the shaft 39.

A motor 53 carries a rigidly mounted sprocket wheel 54 on the end of its drive shaft, the said sprocket wheel being connected by an endless chain 55 with a sprocket wheel 56 rigidly mounted on an end of the shaft 23.

In the operation of the device, the sheets of material which are discharged by the machine 5 with one side facing upwardly, are intercepted by the rotatable shelf 15, the forward edge of the sheet engaging the shoulder 20 of the shelf as indicated by the dotted lines in Fig. 1. As the shelf turns over, the sheets are deposited on the conveyer platform 24 with their reverse sides facing upwardly. Next, the sheets are engaged by one of the pusher bars 35 and lugs 35' and carried beneath the upwardly curved end of the drag member 52. As the sheets are not in proper alinement on the conveyer, when dropped by the rotatable shelf, the gauge bar 45 has been provided. The endless belt 49 of said gauge bar engages the side edge of each sheet and properly alines the sheet on the conveyer according to the angular position of adjustment of said gauge bar, ready to be fed to another machine.

In order to carry the side of the sheet to said gauge bar, the short chain 30' has been provided. This latter chain prevents the side of the sheet from dragging and throwing the sheet out of alinement and carries said side until it is in proper position to be guided by the gauge bar.

Although only the preferred form of sheet handling device has been shown and described, it is not desired to be limited thereto, as the broad concept of the invention contemplates all changes and modifications as may fairly come within the scope of the claims. Some of the novel features of this invention disclosed but not specifically claimed herein, form subject matter of copending application Serial No. 364,293.

What I claim is:

1. A handling device comprising a supporting means, a rotatable member and a shelf in connection with said rotatable member and adjacent said supporting means for receiving material with one side facing upwardly and for turning said material and depositing the same on said supporting means with the other side facing upwardly, said shelf extending on both sides of the axis of the rotatable member to provide an unobstructed surface from one edge to the other for receiving material.

2. A sheet handling device comprising a sheet supporting means, and a rotatable shelf adjacent said supporting means for receiving sheets of material with one side facing upwardly and for turning said sheets and depositing the same on said supporting means with the other side facing upwardly, said shelf having a shoulder provided adjacent one longitudinal edge on one side of the shelf, and having another shoulder provided adjacent the opposite longitudinal edge on the other side of the shelf for temporarily holding sheets on said shelf.

3. A sheet handling device comprising a sheet supporting means, a rotatable shelf adjacent said supporting means for receiving sheets of material with one side facing upwardly and for turning said sheets and depositing the same on said supporting means with the other side facing upwardly, a conveyer on said supporting means for moving the sheets which have been deposited, and guiding means for properly alining said sheets as they are being conveyed along the supporting means.

4. A sheet handling device comprising a sheet supporting means, a rotatable shelf adjacent said supporting means for receiving sheets of material with one side facing upwardly and for turning said sheets and depositing the same on said supporting means with the other side facing upwardly, a conveyer on said supporting means for moving the sheets which have been deposited, and angularly extending guiding means for properly alining said sheets as they are being conveyed along the supporting means.

5. A sheet handling device comprising a sheet supporting means, a rotatable shelf adjacent said supporting means for receiving sheets of material with one side facing upwardly and for turning said sheets and depositing the same on said supporting means with the other side facing upwardly, a conveyer on said supporting means for moving the sheets which have been deposited, and angularly extending adjustable guiding means for properly alining said sheets as they are being conveyed along the supporting means.

6. A sheet handling device comprising a sheet supporting means, means adjacent said supporting means for receiving sheets of material with one side facing upwardly and for turning said sheets and depositing the same on said supporting means with the other side facing upwardly, a conveyer on said supporting means for moving the sheets which have been deposited, guiding means for properly alining said sheets as they are being conveyed along the supporting means, and an endless belt movable longitudinally of said guiding means and engageable with an edge of said sheets.

7. A sheet handling device comprising a sheet supporting means, and a rotatable shelf adjacent said supporting means for receiving sheets of material with one side facing upwardly and for turning said sheets and depositing the same on said supporting means with the other side facing upwardly, said shelf having means provided adjacent one longitudinal edge on one side of the shelf, and having means adjacent the opposite longitudinal edge on the other side of the shelf for temporarily holding sheets on said shelf.

In testimony whereof, I affix my signature.

ARTHUR W. WERNER.